R. RUSTON.
Dressing Millstones.
No. 91,773.
Patented June 22, 1869.
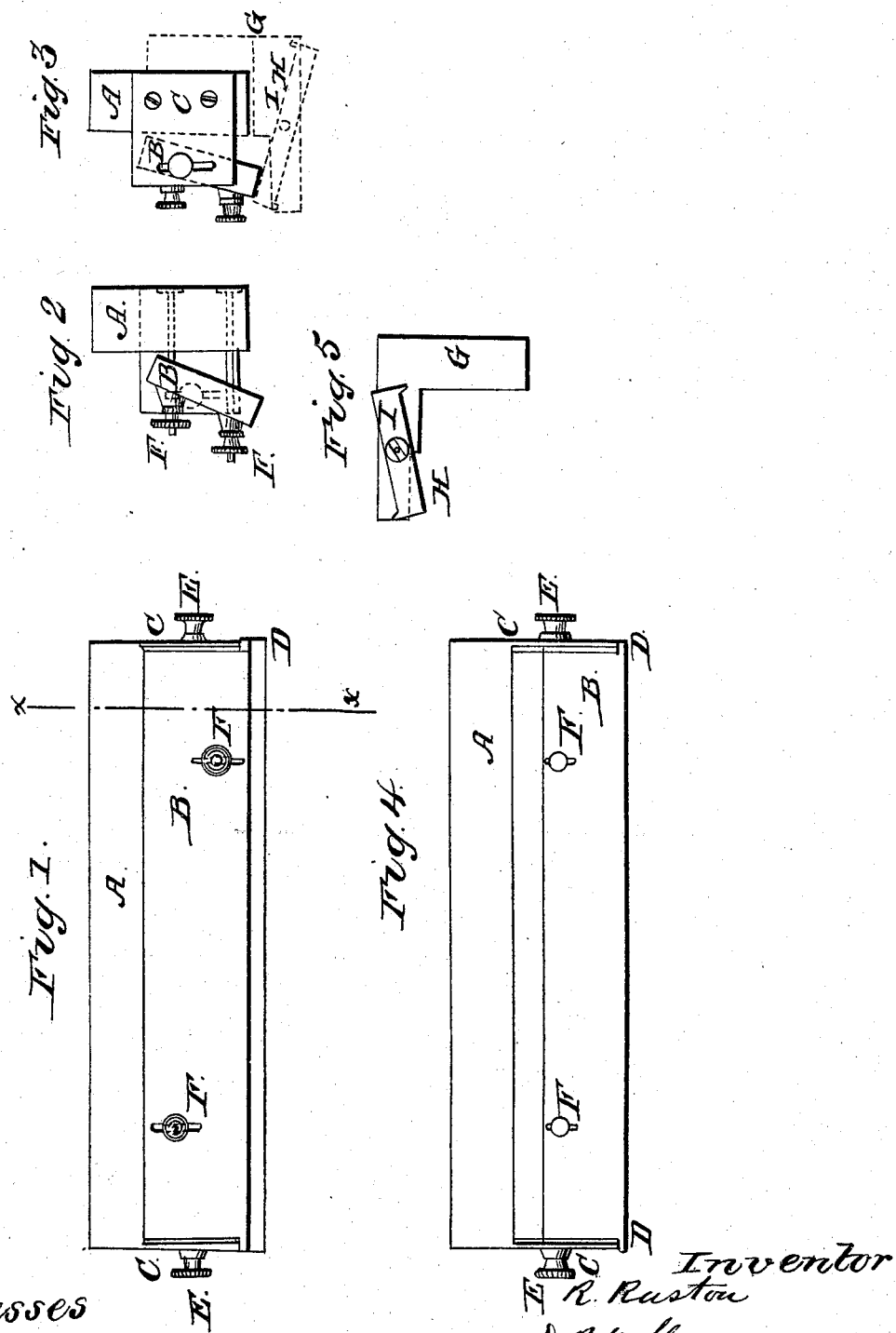

United States Patent Office.

ROBERT RUSTON, OF ROCKVILLE, INDIANA.

*Letters Patent No. 91,773, dated June 22, 1869.*

IMPROVEMENT IN GAUGES FOR DRESSING MILLSTONES.

The Schedule referred to in these Letters Patent and making part of the same.

*To all whom it may concern:*

Be it known that I, ROBERT RUSTON, of Rockville, in the county of Parke, and State of Indiana, have invented a new and useful Improvement in Gauges to be used in Dressing Millstones; and I do hereby declare that the following is a full, clear, and exact description thereof, reference being had to the accompanying drawings, and to the letters of reference marked thereon.

Figure 1 is a side elevation, showing the gauge as set for use;

Figure 2 is a transverse vertical section, on line $x\ x$ of fig. 1;

Figure 3 is an end view or elevation, showing the square used in setting the gauge, in red lines, and in connection therewith;

Figure 4 is a plan view of the gauge; and

Figure 5 is a plan view of the square.

Corresponding letters refer to corresponding parts in the several figures.

This invention relates to a gauge to be used in dressing millstones, and it consists in a gauge for that purpose, so constructed that the depth of the "furrow" to be cut in such stones, and the bevel to be given to certain portions thereof, can be determined or controlled thereby, as will be more fully described hereinafter.

A, in the drawings, represents the body of the gauge, and it may be made of any kind of hard wood, or of metal. Its dimensions may be two inches in depth by three inches in width, or it may be more or less, to suit the views of the constructor. In length it should be about one-half the diameter of the stone upon which it is to be used; and when made of wood, that portion which comes in contact with the stone while in use may be faced with metal.

B represents the gauge proper. It is to be made of wood, (by preference,) and is to be of a length about equal to that of the body to which it is to be attached. Upon each of its ends there is to be a strip of metal, secured by screws, and it is to be provided with screw-bolts, the heads of which may rest against such plates upon their inner sides, or they may pass into the ends of the gauge, and be held in position by a nut inserted therein.

Near the ends of this gauge there are to be formed slots, cut vertically and transversely through the same, through which bolts are to pass for the purpose of adjusting the same, with reference to the body to which it is attached.

C C represent strips of metal, which are to be let into the body of the gauge, so that their outer surface shall be flush with the surface of such body.

By referring to fig. 3, it will be seen that these strips are to be screwed to the ends of the body, and they may be bent so as to pass over a portion of the back surface thereof, and have screws through such portions, for the purpose of still further securing them thereto.

Within that portion of these plates which projects beyond the surface of the body, and near the end thereof, there are to be formed slots, as shown in fig. 3 of the drawings, which are for the purpose of receiving the bolts which adjust the gauge proper.

D represents the plates, above described as being secured to the ends of the gauge proper.

E E represent thumb-nuts, which screw upon the outer ends of the screws, which are inserted into the ends of the gauge B, and, as will be seen, by turning these nuts until their inner surfaces press upon the plates C, the portion B may be held in any desired position, with reference to the body A of the gauge.

F F represent thumb-nuts, which are to be screwed upon bolts which pass through the gauge proper, or the portion B, and are secured to or in the body A. The purpose of these bolts and nuts is to aid in the adjustment of the portion B, with reference to the portion A, and to secure its retention in the proper position, when properly adjusted.

G represents a square, which is to be of metal, and may be of any desired length, and is to have upon one portion thereof a series of lines, as shown in red lines in fig. 3. These lines are for the purpose of aiding in the adjustment of the portion H, soon to be described.

H represents a bar or plate of steel, which is to be pivoted to that arm of square G upon which the lines are formed. Upon opposite ends and upon opposite sides thereof, there are to be formed small points, so that in adjusting the same, with reference to the square, these points shall point directly to one of the lines thereon.

I represents a thumb-nut, which is to be screwed upon a bolt secured to the square, and which receives the plate H, so that when this nut is screwed down upon the plate, it will be held in its proper position, with reference to the square H.

When the gauge has been properly adjusted, it is of great importance to retain it in that position, so that each time the stones are dressed the same may be applied thereto, and thus the exact form given to the furrows may be maintained.

It is found difficult at times to prevent this gauge from getting deranged, in consequence of its being moved or handled when not in use, and hence the necessity of the adjusting-square, which is to be adjusted to such gauge when it is in the position desired, and then carefully laid away for use when required. If, at any time, the parts of the gauge become disarranged, it is only necessary to apply the square to the same, and, through the agency of the nuts and screws with which it is supplied, rearrange the same, and thus the form of furrow in the stone which has been ascertained to be the best, can be accurately preserved during the lifetime of such stones.

The method of applying this gauge is as follows:

It having been constructed and adjusted as above described, and the furrows in the stone having been roughed out, a portion of water-paint is to be applied to the side and edge of the gauge B. It is to be passed over the portion of the stone in which such furrow is formed, when a portion of the paint will be transferred to such stone, and the high parts will be designated and can be removed, and by a continuous application of the gauge the furrows will have the proper uniform depth given them by the tools of the operator; the form being indicated by the gauge, the body portion of which, while in use, always rests upon the smooth surface of the stone to be furrowed.

Having thus described my invention,

What I claim, and desire to secure by Letters Patent, is—

1. A gauge for use in dressing millstones, combining in its construction a bed or principal portion, A, a movable or adjustable portion, B, and adjusting-screws E E and F F, substantially as and for the purpose set forth.

2. The adjustable square, consisting of the parts G, H, and I, constructed and arranged for use, substantially as and for the purpose set forth.

In testimony whereof, I have signed my name to this specification, in the presence of two subscribing witnesses.

ROBERT RUSTON.

Witnesses:
WILLIAM S. MAGILL,
SAMUEL L. McCLURE.